(12) United States Patent
Bramhill et al.

(10) Patent No.: US 10,587,471 B1
(45) Date of Patent: Mar. 10, 2020

(54) CRITERION-BASED COMPUTING INSTANCE ACTIVATION

(71) Applicant: Amazon Technologies, Inc., Reno, NV (US)

(72) Inventors: Gavin Alexander Bramhill, Western Cape (ZA); Andries Petrus Johannes Dippenaar, Western Cape (ZA); Mathew Daniel, Gauteng (ZA)

(73) Assignee: Amazon Technologies, Inc., Seattle, WA (US)

( * ) Notice: Subject to any disclaimer, the term of this patent is extended or adjusted under 35 U.S.C. 154(b) by 505 days.

(21) Appl. No.: 14/109,803

(22) Filed: Dec. 17, 2013

(51) Int. Cl.
*H04L 12/24* (2006.01)
*G06F 9/50* (2006.01)

(52) U.S. Cl.
CPC .......... *H04L 41/082* (2013.01); *G06F 9/5088* (2013.01)

(58) Field of Classification Search
None
See application file for complete search history.

(56) References Cited

U.S. PATENT DOCUMENTS

| | | | | |
|---|---|---|---|---|
| 6,128,661 A * | 10/2000 | Flanagin | ................... | G06F 8/61 709/217 |
| 6,834,302 B1 * | 12/2004 | Harvell | ............. | H04L 29/12066 709/224 |
| 7,496,059 B2 * | 2/2009 | Yoon | ....................... | H04L 12/12 340/870.01 |
| 7,620,705 B2 * | 11/2009 | Hodgson | ............. | H04L 41/0806 709/203 |
| 8,068,433 B2 * | 11/2011 | Hodges | ................. | G06F 1/3209 370/216 |
| 8,127,291 B2 * | 2/2012 | Pike | .................... | G06F 9/45558 718/1 |
| 8,281,010 B2 * | 10/2012 | Ansari | ................... | G06Q 30/04 709/203 |
| 8,286,011 B2 * | 10/2012 | Satsangi | ............... | G06F 1/3209 713/300 |
| 8,892,916 B2 * | 11/2014 | Bieswanger | ......... | G06F 1/3203 713/300 |
| 9,223,596 B1 * | 12/2015 | Araujo | ..................... | G06F 9/455 |
| 9,400,664 B2 * | 7/2016 | Sakata | .................... | G06F 9/455 |
| 9,734,131 B1 * | 8/2017 | Bondalapati | ........... | G06F 17/21 |
| 2004/0145500 A1 * | 7/2004 | Huebl | .............. | H04L 12/40039 340/994 |
| 2004/0237079 A1 * | 11/2004 | Cox | .......................... | G06F 8/65 717/168 |
| 2009/0210519 A1 * | 8/2009 | Zill | ......................... | H04L 12/12 709/220 |
| 2010/0077063 A1 * | 3/2010 | Amit | ...................... | H04L 12/12 709/221 |
| 2010/0153762 A1 * | 6/2010 | Radulescu | .......... | H04M 1/7253 713/323 |

(Continued)

*Primary Examiner* — Patrice L Winder
*Assistant Examiner* — Angela M Widhalm De Rodrig
(74) *Attorney, Agent, or Firm* — Davis Wright Tremaine LLP

(57) ABSTRACT

Method and apparatus for activating a computing instance are disclosed. In the method and apparatus, a computing instance is activated if received traffic addressed to the computing instance is determined to satisfy one or more conditions for computing instance activation. Following activation, the data may be sent to the computing instance for processing.

21 Claims, 9 Drawing Sheets

(56) References Cited

U.S. PATENT DOCUMENTS

| | | | | |
|---|---|---|---|---|
| 2010/0312909 A1* | 12/2010 | Diab | G06F 1/3209 | 709/238 |
| 2010/0332212 A1* | 12/2010 | Finkelman | G06F 1/3203 | 703/23 |
| 2011/0185208 A1* | 7/2011 | Iwamoto | G06F 1/3203 | 713/323 |
| 2011/0191610 A1* | 8/2011 | Agarwal | G06F 1/3203 | 713/310 |
| 2011/0296214 A1* | 12/2011 | Arntzen | G06F 1/3203 | 713/320 |
| 2013/0097240 A1* | 4/2013 | Ling | G06F 1/3209 | 709/204 |
| 2013/0301569 A1* | 11/2013 | Wang | H04L 5/0055 | 370/329 |
| 2013/0326206 A1* | 12/2013 | Lueck | G06F 9/4418 | 713/2 |
| 2013/0332627 A1* | 12/2013 | Skog | H04W 4/70 | 709/244 |
| 2014/0208132 A1* | 7/2014 | Cheston | G06F 1/26 | 713/310 |
| 2014/0215076 A1* | 7/2014 | Grothues | G06F 9/455 | 709/226 |
| 2015/0089262 A1* | 3/2015 | Cairns | G06F 1/32 | 713/323 |

\* cited by examiner

CRITERION-BASED COMPUTING INSTANCE ACTIVATION

BACKGROUND

The use of network computing and storage has proliferated in recent years. The resources for network computing and storage are often provided by computing resource providers who leverage large-scale networks of computers, servers and storage drives to enable customers to host and execute a variety of applications and web services. The customers, who traditionally used on-site servers and storage equipment to meet their computing demands often forego on-site hosting and storage and turn to using the resources of the computing resource providers. The usage of network computing allows the customers to efficiently and adaptively satisfy their computing needs. Without investing in computing infrastructure, the customers may add computing and storage resources from a large pool provided by a computing resource provider. Further, when their demand for computing resources decreases, the computing resources may be reallocated for other uses.

To ensure efficient utilization of network computing resources it is often challenging to manage the allocation of computing resources and ensure that customer applications requiring computing resources can timely receive the computing resources. Further, it is often challenging to enforce efficiency mechanisms such that under-utilized resources may be reallocated for alternative use.

BRIEF DESCRIPTION OF THE DRAWINGS

Various embodiments in accordance with the present disclosure will be described with reference to the drawings, in which.

DETAILED DESCRIPTION

Figure 1:
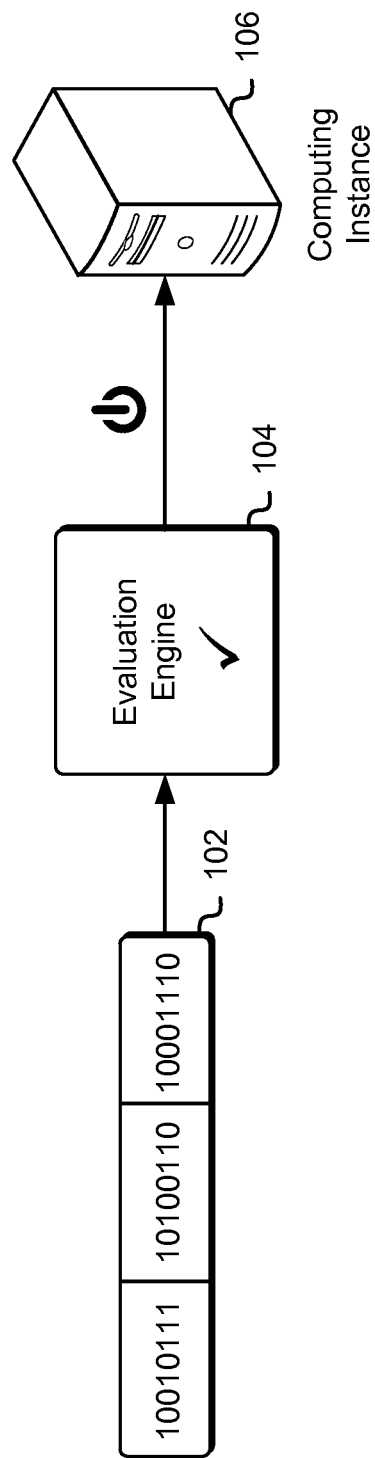
FIG. 1 shows an example of computing instance activation in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include activating a computing instance based at least in part on one or more activation criteria. The computing instance (also referred to herein a compute node) may be any type of physical computing device, such as a computer or a server, or virtual computing machine that is instantiated using an underlying physical computer, such as a host or server. The computing instance may be capable of providing any type of computing functionality to a customer and enabling a variety of functions, such as executing a web server, an email server or a database management system, among others. Further, the computing instance may be configured to provide a desktop computing environment that a user can connect to via a remote desktop service. To perform its computing functionality, the computing instance receives data from a variety of parties including clients or administrators of the computing instance. The data may include requests to perform computing functionality and may be packetized in accordance with a variety of protocols including, but not limited to, Transmission Control Protocol (TCP) and Hyper-Text Transfer Protocol (HTTP). The computing instance may process the received data and may cause one or more actions to be performed as may be necessary based at least in part on the received data. Accordingly, communicating with the computing instance may be necessary to utilize the computing functionality provided by the computing instance.

An active computing instance may be readily available to provide computing functionality. However, an inactive computing instance may require one or more activation processes or procedures to be performed prior to being able to provide computing functionality. Further, an active computing instance uses underlying computing resources, such as central processing unit (CPU) power and memory and storage resources, whereas a deactivated computing instance does not. Accordingly, when the computing instance is inactive, the computing resources may be made idle or repurposed for other functionality. Additionally, if a customer utilizing the computing instance is charged per activity time of the computing instance, the customer may realize financial savings due to the fact that the customer is not using resources when their instances are inactive. To conserve resources, a computing instance may be deactivated due at least in part to one or more factors that may include a decrease in demand on the computing functionality provided by the computing instance and the like.

After deactivation, requests may continue to be sent to the computing instance from clients, administrators and the like. One or more criteria for activating the computing instance may be put in place and used to determine whether the computing instance is to remain inactive or become active in order to process the requests. The one or more activation criteria may specify constraints or limits on the received data beyond which the computing instance may be activated. For example, when the received data is comprised of data packets, the one or more activation criteria may specify a protocol type, a packet count or a time of receipt of the data packet that would cause the computing instance to become active. For example, the one or more criteria may specify that the computing instance is to be activated if more than 10 TCP packets are received in less than one minute. Further, the one or more activation criteria may specify that the computing instance is to be activated if the received data packets satisfy one or more requirements related to a port, a network address (for example, an Internet protocol (IP) address of a network), a host address (for example, an IP address of a host), a rate of receipt, or a specified content associated with the data packet. The one or more activation criteria may be based at least in part on time-related factors, such as time of a day or day of a week. In addition, the one or more activation criteria may be based at least in part on a network to which the computing instance or a host of the computing is attached or an IP address, subnet or geographic location of originating traffic. The satisfaction of the one or more activation criteria may be conditional on the satisfaction of various factors, whereby some of the factors may be nested and their evaluation may be contingent upon the satisfaction of another set of factors. In some embodiments, the received data used for evaluating the one or more activation criteria may not be data whose distinctive purpose is to activate the computing instance, such as an electronically signed application programming interface (API) call to activate the computing instance. Instead, the data may be any type of data that the computing instance is configured to process, such as a TCP request addressed to the computing instance and the like.

If the one or more activation criteria are met, the computing instance may be activated for processing the data utilized in the evaluation or a portion thereof. Additionally, subsequently received data intended for the computing instance may be sent to the computing instance. As described herein, data that is intended for a computing instance may be data that is addressed to the computing instance, for example, by including a host address or network address of the computing instance, or data that is typically processed by the computing instance within the context of an overall system.

FIG. 1 shows an example of computing instance activation in accordance with at least one embodiment. One or more data portions 102 that are intended for a computing instance 106 are received by an evaluation engine 104. The evaluation engine 104 may store one or more conditions for activating the computing instance 106 based at least in part on the received one or more data portions 102. The evaluation engine 104 determines whether the one or more data portions 102 satisfy the one or more conditions for activating the computing instance 106. To be satisfied the one or more conditions for activating the computing instance 106 may be required to be at least met, whereby if the one or more data portions 102 exceed or surpass a threshold or limit set by the one or more conditions, the one or more conditions may be satisfied. If the one or more conditions are met, the computing instance 106 may be activated, whereby upon activation the computing instance 106 becomes operational and capable of processing received data. Further, the received data 102 or a portion thereof may be sent to the computing instance 106 for processing.

Figure 2:
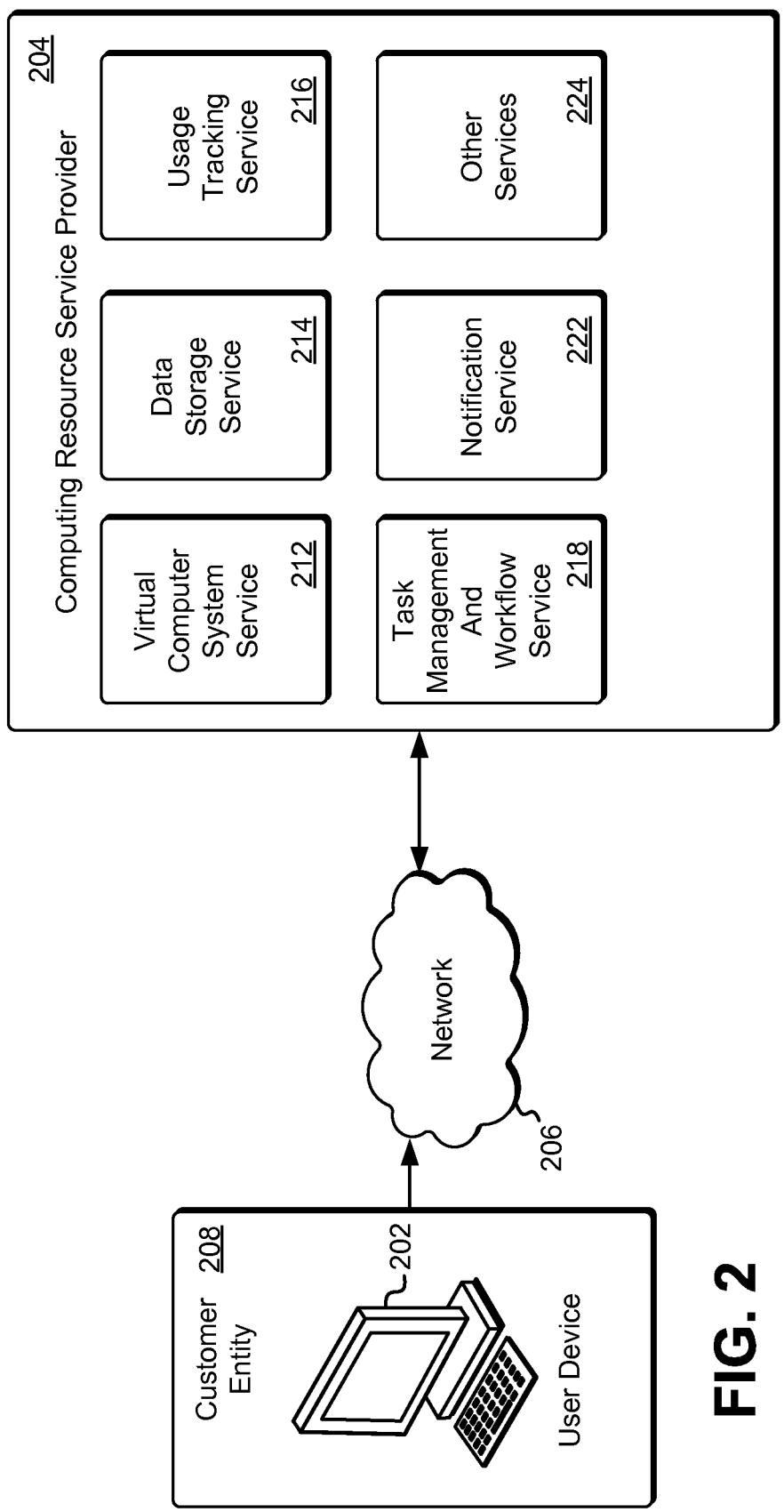
FIG. 2 shows an example of a user device in communication with a computing resource service provider in accordance with at least one embodiment.

FIG. 2 shows an example of a user device in communication with a computing resource service provider in accordance with at least one embodiment. The user device 202 that is associated with a customer entity 208 communicates with the computing resource service provider 204 over a network 206. The customer entity 208 may be an organization or group, whereby the organization or group may utilize the services of the computing resource service provider 204 for a variety of purposes, such as running web or email servers, operating business applications or, generally, providing computing power for customer servers. Although one user device 202 is shown as belonging to the customer entity 208, it is noted that a plurality of devices may be associated with the customer entity 208. In addition, one or more of the devices may belong to an administrator that is responsible for assigning privileges and permissions to the users associated with the customer entity 208.

The user device 202 may be any device that is capable of communicating with the computing resource service provider 204 or its associated entities. The user device 202 may also be equipped with local or remote (for example, network-based) computational and storage capabilities. The computational capabilities may be provided or enabled by a processor, such as a central processing unit (CPU), graphics processing unit (GPU) and digital signal processor (DSP), among others. Examples of CPUs include CPUs that employ an x86 architecture (for example, as used in desktop and laptop computing devices) or a reduced instruction set computing (RISC) architecture (for example, as used in smartphone and tablet computing devices). The user device 202 may also be equipped with communications and networking hardware and may be capable of communicating using any communications protocol. Further, the user device 202 may be equipped with input/output devices that may include a display, a touch screen-based or keyboard-based input device or speakers.

Additionally, the user device 202 may include any type of memory, such as static or dynamic memory and a power source or a power adapter. Aside from its hardware capability, the user device 202 may be configured to run or execute an operating system and/or other programs and the user device's 202 associated memory may store executable instructions that, when executed by one or more processors of the user device 202, cause one or more functions to be performed or cause the operating system and/or other programs to run. The user device 202 may be associated with a customer, which may be an organization that may utilize one or more of the services provided by the computing resource service provider 204, for example, to maintain and deliver information to its employees, which may be located in various geographical locations. Additionally, the customer may be an individual that utilizes the services of the computing resource service provider 204 to deliver content to a working group located remotely.

The network 206 may be a collection of routers, switches or various other types of devices that enable data (for example, protocol-compliant packets) to be exchanged between the user device 202 and the computing resource service provider 204. The network 206 may be public or private, whereby examples of the network 206 include the Internet, an intranet or an Internet service provider (ISP) network.

The computing resource service provider 204 may provide various computing resource services to its customers. The services provided by the computing resource service provider 204, in this example, include a virtual computer system service 212, a data storage service 214, a usage tracking service 216, a task management and workflow service 218 and a notification service 222. It is noted that not all embodiments described herein include the services 212-224 described with reference to FIG. 2 and additional services may be provided in addition to or as an alternative to services explicitly described herein. As described herein, each of the services 212-224 may include one or more web service interfaces that enable the customer to submit appropriately configured application programming interface (API) calls to the various services through web service requests. In addition, each of the services 212-224 may include one or more service interfaces that enable the services to access each other (e.g., to enable a virtual computer system of the virtual computer system service 212 to store data in or retrieve data from the data storage service 214 or enable the usage tracking service 216 to track usage metrics or utilization statistics of an instantiated virtual machine of the virtual computer system service 212).

The virtual computer system service 212, which is an example of a compute service, may be a collection of computing resources configured to instantiate virtual computer systems on behalf of a customer. The customer may interact with the virtual computer system service 212 (via appropriately configured and authenticated API calls) to provision and operate virtual computer systems that are instantiated on physical computing devices hosted and operated by the computing resource service provider 204. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 212 is shown in FIG. 2, any other computer system or computer system service may be utilized in the computing resource service provider 204, such as a computer system or computer system service that does not employ virtualization, instantiation or abstraction and instead provisions computing resources on dedicated or shared computers/servers and/or other physical devices. For example, the computing resource service provider 204 may include a compute service that provides a customer with access to physical computing resources, such as physical computers or servers, and/or virtual computing resources, such instantiated virtual computer systems.

The data storage service 214 may comprise one or more computing resources that collectively operate to store data for a customer using any type of storage, such as block-level storage or object-level storage. Storage devices utilized by the data storage service 214 may, for instance, be operationally attached to virtual computer systems provided by the virtual computer system service 212 to serve as logical units (e.g., virtual drives) for the computer systems. A storage device may enable the persistent storage of data used/generated by a corresponding virtual computer system where the virtual computer system service 212 may only provide ephemeral data storage.

The usage tracking service 216 may be a collection of computing devices and other resources collectively configured to collect metrics or statistics on the usage of resources allocated to a customer or any other party. For example, the usage tracking service 216 may collect metrics on the usage of virtual computer systems (also referred to herein as, instantiated virtual machines or computing instances) provisioned by the virtual computer system service 212 and may make the metrics available to the customer. Further, the collected metrics or utilization statistics may be used to scale resources allocated to the customer dynamically (for example, by a scaling service (not shown)) or manually by the customer (for example, based on monitoring or observing provided usage statistics). The scaling may include causing the activation or deactivation of one or more virtual computer systems, among other resources. Upon configuration, a resource, such as a virtual computer system, may be registered with the usage tracking service 216 and may be instructed to provide statistics to the usage tracking service 216 periodically or at least in part as a result of polling.

The task management and workflow service 218 may be a collection of computing devices and other resources collectively configured to perform task coordination and management services that enable executing computing tasks across a plurality of computing environments and platforms. The task management and workflow service 218 tracks the progress of workflow execution and performs the dispatching and holding of tasks. Further, the task management and workflow service 218 may control the assignment of hosts or physical or virtual computing systems used for executing the tasks. A workflow may be defined for execution, for example, using an application programming interface (API) configured function call to the task management and workflow service 218, whereby the workflow may include one or more tasks. As part of defining the workflow, a task order and execution loops may be provided for the workflow and conditional flows and timeout periods for restarting or terminating the execution of the workflow may be specified.

The notification service 222 may comprise a collection of computing resources collectively configured to provide notifications to clients, users, customers and the like using a "push" mechanism without the need to periodically check or "poll" for new information and updates. The notification service 222 may further be used for various purposes such as monitoring applications executing in the virtual computer system service 212, workflow systems, time-sensitive information updates, mobile applications, and many others. The notification service 222 may comprise a collection of computing resources collectively configured to provide a web service or other interface and browser-based management console. The management console can be used to configure topics for which customers seek to notify applications (or people), subscribe clients to the topics, publish messages, or configure delivery of the messages over a protocol of choice (i.e., hypertext transfer protocol (HTTP), e-mail and short message service (SMS), among others).

The computing resource service provider 204 may additionally maintains one or more other services 224 based at least in part on the needs of customers. For instance, the computing resource service provider 204 may maintain a database service. The database service may be a collection of computing resources that collectively operate to run one or more databases and a customer may operate and manage a database from the database service by utilizing appropriately configured API calls. This, in turn, may allow for maintaining and potentially scaling the operations in the database. Other services include, but are not limited to, object-level archival data storage services, services that manage and/or monitor other services and/or other services.

Figure 3:
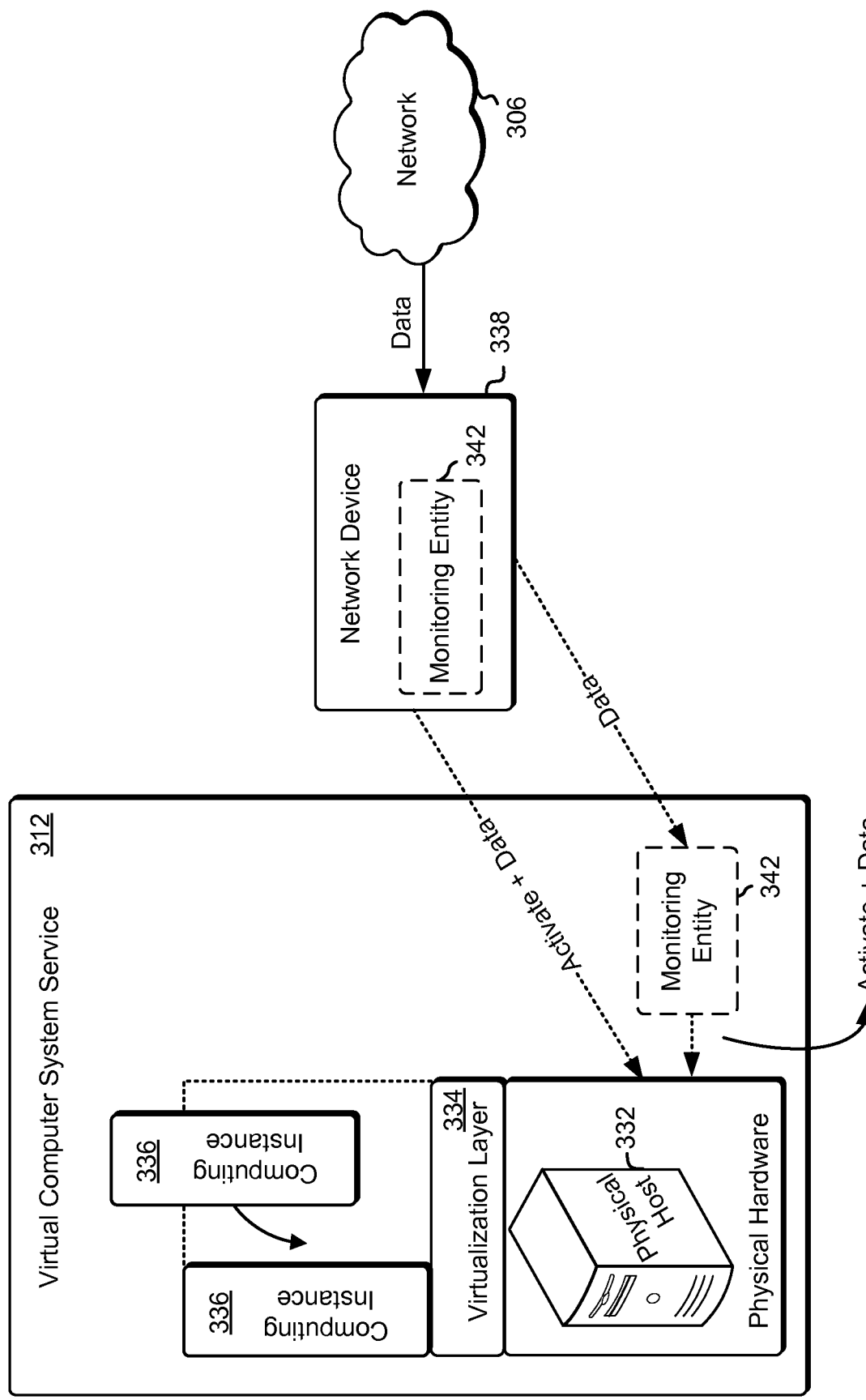
FIG. 3 shows an example of a virtual computer system service in accordance with at least one embodiment.

FIG. 3 shows an example of a virtual computer system service in accordance with at least one embodiment. The virtual computer system service 312 may comprise a collection of computing resources collectively configured to instantiate one or more computing instances 336 and render the one or more computing instances 336 operational and readily available for performing a computing functionality. It is noted that instantiating a computing instance may also be referred to as placing, activating or launching the computing instance. Further, as described herein, a computing instance may also be referred to herein as a virtual machine, a virtual computer, or an abstracted machine that utilizes underlying hardware computing resources, such as CPUs, memory devices, buses and networking cards and devices, among others, to provide a computing platform for customers. The computing instance may be associated with a computer-readable storage medium having collectively stored thereon executable instructions that, when executed by one or more processors, cause the execution of an operating system as well as one or more other applications, whereby the operating system and the one or more other applications may be specified by the customer. Further, the computing instance may be launched for use on an on-demand basis (for example, based at least in part on a need for computing resources) and may be deactivated or suspended, for example, due at least in part on a customer's instruction or if demand for the resources provided by the virtual computer drops. When deactivated or suspended, the computing instance may be wholly or partially unavailable to perform computing functionality. In some embodiments, configuration information or memory content for a suspended instance may be stored in memory for retrieval when reinstating the computing instance.

The virtual computer system service 312 includes physical hardware that includes a physical host 332 as shown in FIG. 3 as well as other components. Although one physical host 332 is shown in FIG. 3 it is understood that a plurality of physical hosts may be utilized as part of the physical hardware. The physical host may be any type of device or component that is capable of providing computing functionality, such a server or a computer. The physical hardware may also include other components, entities or devices, such as storage devices (for example, hard disks and solid state drives), routers and switches.

The virtual computer system service 312 utilizes a virtualization layer 334 to cause the instantiation of one or more computing instances 336 (singularly referred to herein as computing instance 336). The virtualization layer 334 may include executable instructions, firmware or hardware that instantiates or presents operating systems to the computing instances 336 and manages the execution of the computing instances 336, whereby examples of the virtualization layer 334 may include a hypervisor. One or more computing instances 336 may be executed on one or more physical hosts 332 and utilizing the physical hardware.

Once instantiated a computing instance 336 may operate as a server supporting a website or may operate to support business applications or, generally, to serve as computing power for the customer. The computing instance 336 may also support database applications, electronic commerce applications and/or other applications. An activate computing instance 336 may be capable of receiving data and service requests, processing the data and satisfying the service requests per the computing instance's 336 configured operation. The data may be packetized in accordance with any type of protocol and the computing instance may be able to process the packets. For example, a computing instance that operates as a web server may receive HTTP requests from a client attempting website access. Further, the computing instance 336 may process the HTTP requests and respond to the requests. In addition, the computing instance 336 may be configured to provide a remote desktop service to one or more organization employees and may be capable of receiving various data including requests from organization members, processing the data and responding to the members as necessary.

Further, the computing instance 336 may be associated with a network interface that is executed by the physical host 332, the virtualization layer 334 or an external networking service. When the computing instance 336 is active, the network interface may be placed and may, accordingly, enable receipt of packets destined to the computing instance 336, for example, by directing, to the computing instance 336, traffic addressed to a public or private address of the computing instance 336. In addition, traffic that is sent to the computing instance may be sent to the physical host 332, which may in turn forward the traffic to the computing instance 336 via the virtualization layer 334 and vice-versa.

An active computing instance 336 may be readily available for performing a computing functionality and processing data without a need for performing a launch or activation procedure. Further, after instantiation, the computing instance 336 may be deactivated or disabled. For example, a computing instance 336 that provides remote desktop service to organization employees may be deactivated after an employee logs off a remote desktop or after a discontinuity in network traffic. The computing instance 336 may be reactivated at a certain time (for example, at the start of a workday) or upon detecting receipt of network traffic. As a result of deactivation the underlying computing resources utilized by the computing instance 336 may be repurposed or reused for other computing functionality (such as supporting another computing instance) or, alternatively, made idle. Further, upon deactivation, the network interface associated with the computing instance becomes unplaced and data may no longer be routed to the computing instance 336. Data otherwise serviced by the computing instance 336 may not be attended to, processed or otherwise satisfied due at least in part to the deactivation of the computing instance or the fact that the network interface no longer sends data to the computing instance 336.

A deactivated computing instance 336 may be reactivated based at least in part on need or demand for computing resources provided by the computing instance 336. When reactivated, the computing instance 336 may become available to perform its intended function. The computing instance 336 may be reactivated using the same or different underlying physical hardware as used prior to deactivation. For example, configuration for the computing instance 336 may be stored and retrieved for usage in reactivating the computing instance 336. Further, upon reactivation a network interface may be placed for the computing instance 336 to facilitate sending intended traffic to the computing instance 336.

Data that is intended for the computing instance 336 may be received, from a network 306, by a network device 338. The network device 338 may be any device that is capable of being coupled to a network and capable of receiving or routing data. The network device 338 may, for example, be a router or a networking address translation device. Although one network device 338 is shown with reference to FIG. 3, it may be contemplated that a plurality of network devices may be used or optimally disposed to receive network traffic, such as Internet traffic. When one or more computing instances 336 are activated, the network device 338 may route received data to the one or more computing instance 336 based at least in part on, for example, a host address associated with the one or more computing instances 336 being identified in the received data, a port address and the like.

In some embodiments, the network device 338 also includes a monitoring entity 342. The monitoring entity 342 may be a collection of computing resources collectively configured to evaluate received data intended for a deactivated computing instance and may determine whether a reactivation criterion (also referred to herein as an activation threshold) for reactivating the computing instance 336 has been met. If the reactivation criterion is met, the monitoring entity 342 may further be configured to cause the computing instance for which the data is intended to be activated or initiate the activation of the computing instance 336. Further, the monitoring entity 342 may cause the data to be sent to the activated computing instance 336.

Further, in alternative embodiments, the monitoring entity 342 may be part of the virtual computer system service 312 or any other entity, such as any other entity of the computing resource service provider 204 described with reference to FIG. 2. As shown in FIG. 3, the network device 338 may route data to the monitoring entity 342, whereby when the computing instance 336 is inactive, the network device 338 may send data intended to the computing instance to the monitoring entity 342 and the monitoring entity 342 may evaluate the received data to determine whether to reactivate the computing instance 336 based at least in part on the evaluated data. As described herein, the network device 338 may have one or more route tables, and in the one or more route tables a network address of the computing instance 336 may be associated with the monitoring entity 342. The network device may forward data addressed to the computing instance 336 to the monitoring entity 342. The resources associated with the monitoring entity 342 may be scaled to manage changes in traffic volume and may be configured to enforce customer policies. In an embodiment, the monitoring entity 342 may be executed by a second computing instance 336 of the virtual computer system service 312, the network device 338 may be configured to send data intended to a deactivated computing instance to the second computing instance 336 for evaluation. The second computing instance 336 may monitor the data and determine whether to activate the computing instance.

If it is determined that the computing instance is to be activated, the data utilized for determining whether the activation criterion is met may be sent to the activated computing instance for processing. For activation, the virtual computer system service 312 may be instructed to activate the computing instance 336 and configuration information or instance set-up parameters may be retrieved from a database or storage for launching the computing instance 336.

Figure 4:
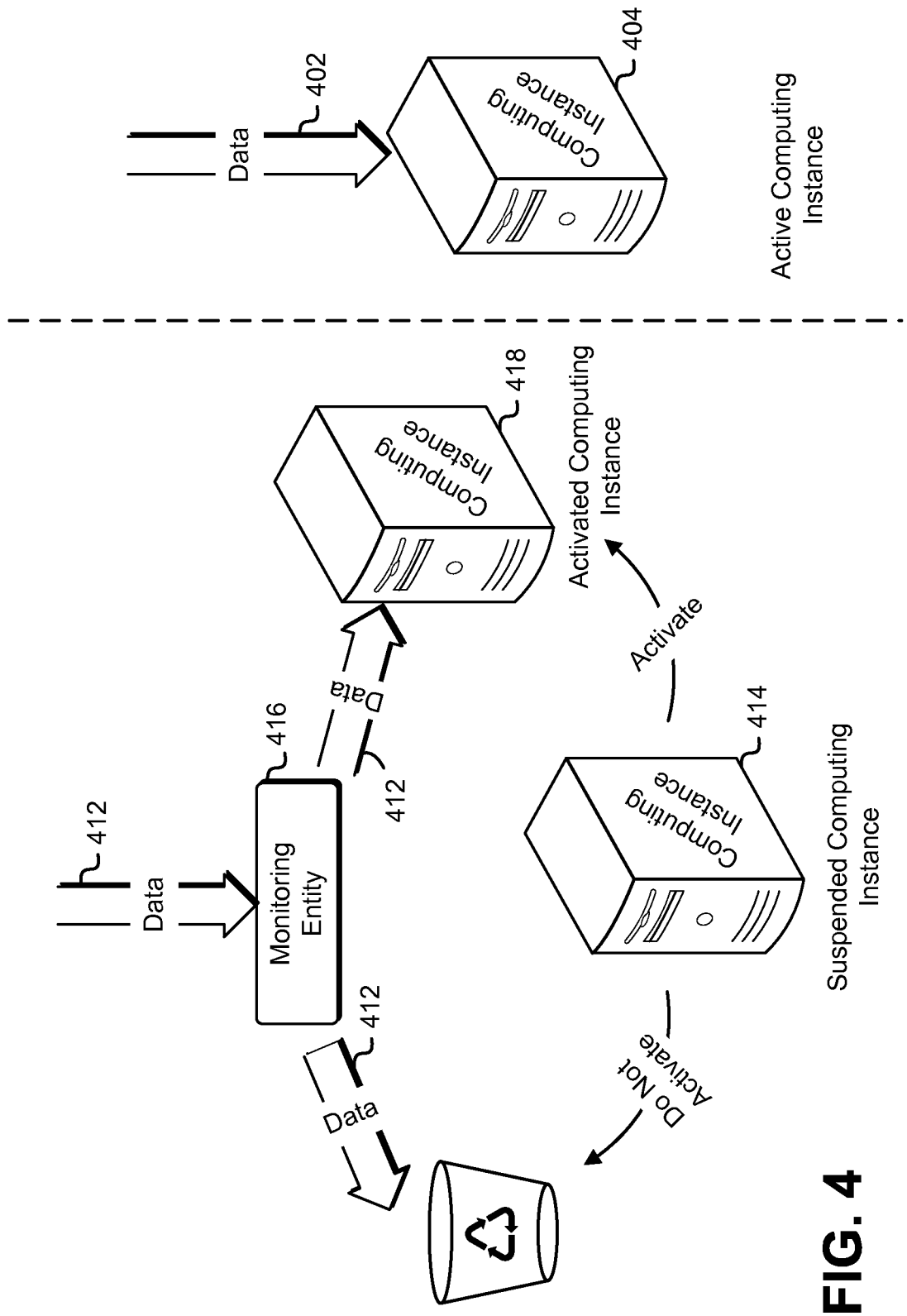
FIG. 4 shows an example of data routing for an active computing instance and a suspended computing instance in accordance with at least one embodiment.

FIG. 4 shows an example of data routing for an active computing instance and a suspended computing instance in accordance with at least one embodiment. In FIG. 4, a first portion of data 402, which may be any type of network traffic may include one or more bits, Bytes or packets, is addressed to an active computing instance 404 and, accordingly, is provided to the active computing instance 404. The active computing instance 404 may be suspended for a variety of reasons as described herein, such as a reduction in the demand for the computing resources provided by the active computing instance 404 or due at least in part to an activity schedule for the computing instance 404. In an example embodiment, once the instance is made inactive the network address of the instance can be associated with the monitoring entity by a system that manages network addresses for the network. Updated route tables reflecting that the monitoring entity has the network address of the instance can be propagated to the appropriate network devices.

The data flow for a suspended computing instance 414 is also shown in FIG. 3. A second portion of data 412 that is addressed to the suspended computing instance 414 may be received and provided to a monitoring entity, for example, by a router or any other type of network device according to the updated routing tables. The router may, for example, maintain an association between a destination address (for example, a network address or host address) and the monitoring entity's address. The monitoring entity may evaluate the second portion of the data 412 to determine whether the suspended computing instance 414 is to be activated. If the monitoring entity determines that the suspended computing instance 414 is to be activated, one or more workflows may be launched for activating the suspended computing instance 414. The one or more workflows may include a set or a group of operations or tasks whose execution may be coordinated and their dependencies may be managed, whereby a workflow may be used for executing processing steps and structuring the processing steps in a manner that is failure-resilient and that may be audited. The task management and workflow service described with reference to numeral 218 may be used to track workflow execution and perform the dispatching and holding of tasks for instance activation. Upon the activated computing instance 418 being available for receiving data, route tables can be updated again so the second portion of data 412 is sent to the activated computing instance 418. Additionally, subsequent received portions of traffic are also sent to the activated computing instance 418. Further, on a condition that the suspended computing instance 414 is not activated (for example, due to an activation criteria not being met), all or some of the second portion of data 412 may be discarded.

Figure 5:
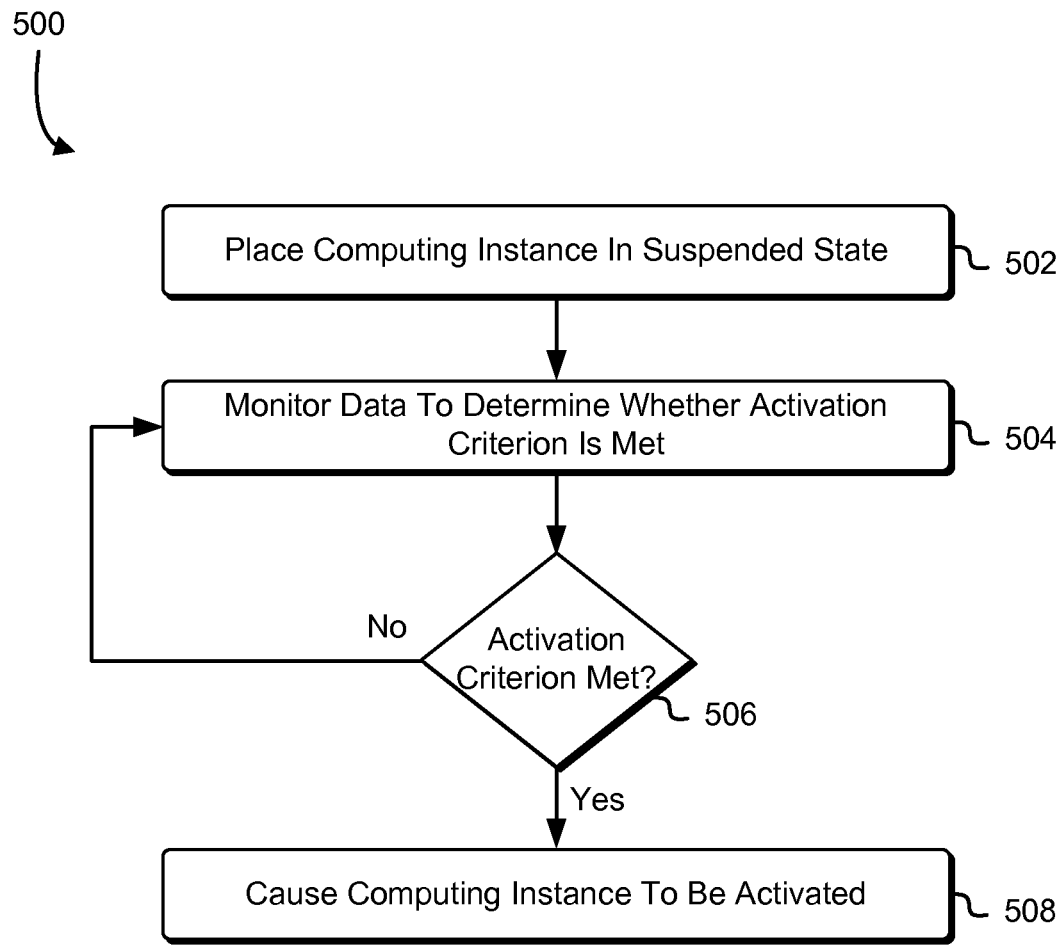
FIG. 5 shows an example of a method for computing instance activation in accordance with at least one embodiment.

FIG. 5 shows an example of a method for computing instance activation in accordance with at least one embodiment. In the process 500, a computing instance is placed 502 in a suspended state. The computing instance may be placed in a suspended state based at least in part on metrics or statistics of the usage of the computing instance collected externally by a usage tracking service or an internal control plane agent of the computing instance or its associated physical host, a schedule for computing instance activity or a customer instruction, among others. The usage metrics or statistics may include CPU utilization, memory utilization or the amount of input and output operations or data in bits, Bytes or packets per unit time. Triggers for deactivation based at least in part on the usage metrics and statistics may be put in place. Further, deactivation may be performed due to the conditions for activation not met in the course of operation of the instance. Further and by way of example, a control plane agent resident on the computing instance may be configured to voluntarily suspend the computing instance upon one or more conditions being satisfied, such as the completion of the execution of a workflow, a set of instructions or a task. As described herein, deactivating a computing instance may include causing the computing instance to enter a hibernation state or a sleep state, whereby, for example, the computing instance may not be responsive to requests or instructions to perform computational functions.

Following deactivation, a monitoring entity monitors 504 received data to determine whether one or more activation criteria for the computing instance are met. As described herein, the monitored data may be intended for the computing instance. The monitoring entity then determines 506 whether an activation criterion is met. If a negative determination is made, the monitoring entity continues monitoring data as the data is received while the computing instance is retained in the suspended state. Due to the fact that the activation criterion is not met, the monitoring entity may reset any counters used to monitor whether the activation criterion is met. Further, the monitoring entity may evaluate whether the activation criterion is met anew for a new time period and without considering the previously monitored data of a previous time period.

If, on the other hand, a positive determination is made, the monitoring entity causes 508 the computing instance to be activated. It is noted that the process 500 is advantageous in that the computing instance may be activated independently of customer instruction. In accordance with some embodiments described herein, a customer may not be required to "snoop" or have one or more computing resources configured to snoop the network in order to determine whether a computing instance is to be activated.

Figure 6:
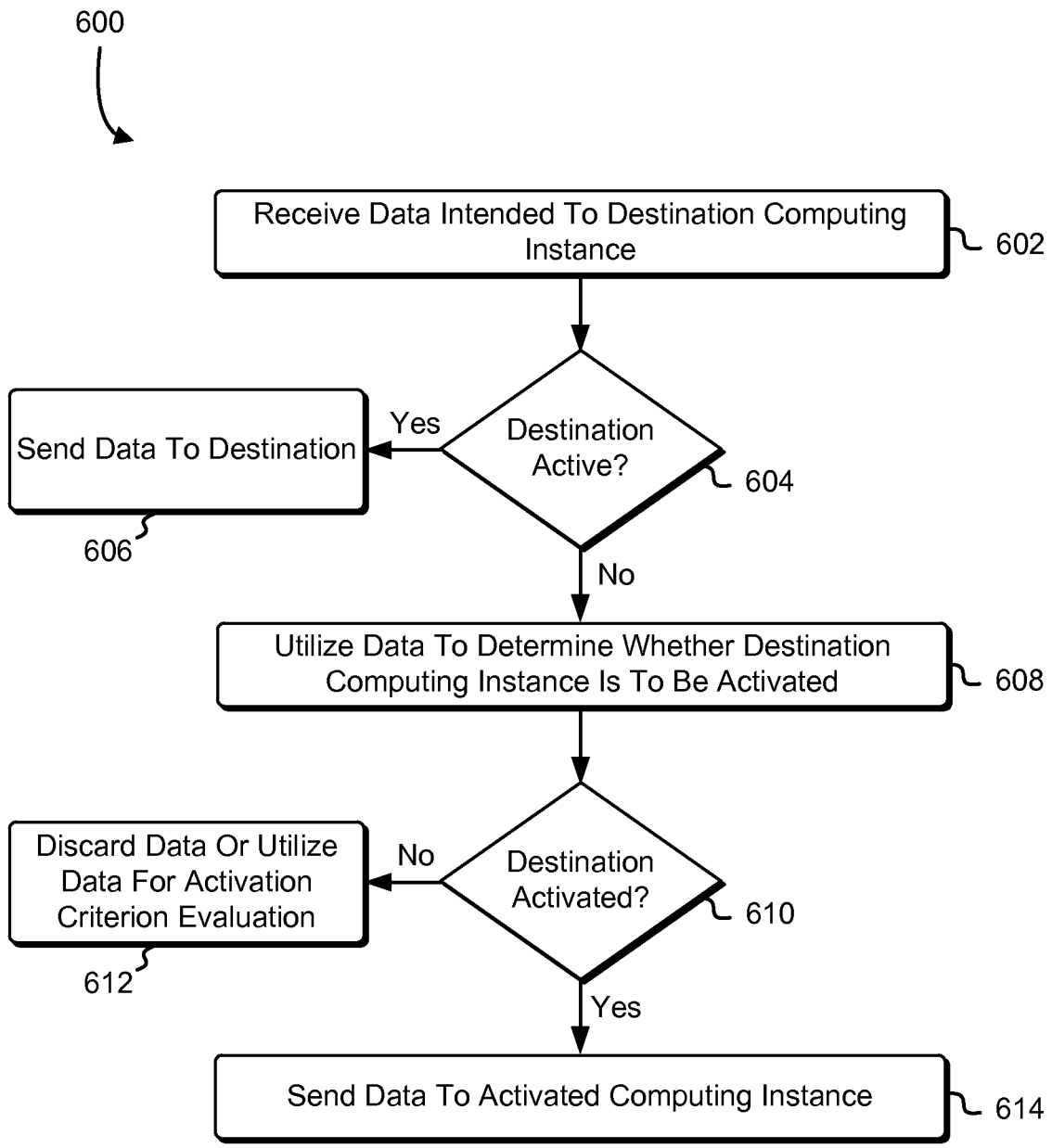
FIG. 6 shows an example of a method for processing data for computing instance activation in accordance with at least one embodiment.

FIG. 6 shows an example of a method for processing data for computing instance activation in accordance with at least one embodiment. In the process 600, a computing resource service provider or an entity associated with the computing resource service provider, such as a network device, receives 602 data intended to a destination computing instance. It is determined 604 whether the destination computing instance is active. If the computing instance is active, the data is sent 606 to the computing instance. However, if the destination is not active, the computing resource service provider or an entity associated with the computing resource service provider utilizes 608 the data to determine whether the destination computing instance is to be activated.

Utilizing the data to determine whether the destination computing instance is to be activated may include determining whether one or more activation criteria are met, whereby the one or more activation criteria may be based at least in part on the received data. The data may include data packets and the activation criteria may specify the protocol type for the received packets, for example, TCP or HTTP, or a number of packets, for example, packet count, among others. Further, the criteria may depend upon a port associated with the packets (for example, a source port address or a destination port address), a destination address or a source address specified in the packets, whereby the address may be a network address or a host address, among others. In addition, the criteria may depend upon the content of the packets, time of receipt of the packets or rate at which the packets are received. It is noted that any combination of the factors described herein may be utilized to specify an activation criterion, whereby the activation criterion may utilize one or more activation metrics that are associated with any combination of factors. If the received data exceeds a threshold specified by one or more conditions of the one or more activation criteria, the one or more activation criteria may be met.

A data store may be utilized to retain data utilized for evaluating an activation criterion. Limits may be imposed on the amount of time received data may be retained in the data store, whereby, for example, not all received data may be utilized in evaluating an activation criterion at a certain point in time. A time to live or lifespan may be associated with a received packet, whereby following the expiration of the lifespan, the packet may no longer be used in evaluating the activation criterion or may no longer factor in a decision to activate a computing instance. Further, in some embodiments, it may be desirable to exclude certain types of data from usage in activation criterion evaluation. For example, data associated with port scanning operations, probing and networking mapping may be excluded as the data may not be intended for handling by the computing instance and may instead be intended for collecting system-wide metrics or performing system-wide snooping operations.

Following utilization of the data to determine whether the destination computing instance is to be activated, the computing resource service provider determines 610 whether the destination computing instance became activated. If a negative determination is made, the computing resource service provider discards 612 the data or utilizes the data for activation criterion evaluation as described herein. The determination whether to discard the data may be based at least in part a lifespan time associated with the data. If a positive determination is made, the computing resource service provider sends 614 the data to the activated computing instance. In some embodiments, only a portion of the data may require processing by the computing instance and, accordingly, the portion of the data may be sent to the computing instance.

Figure 7:
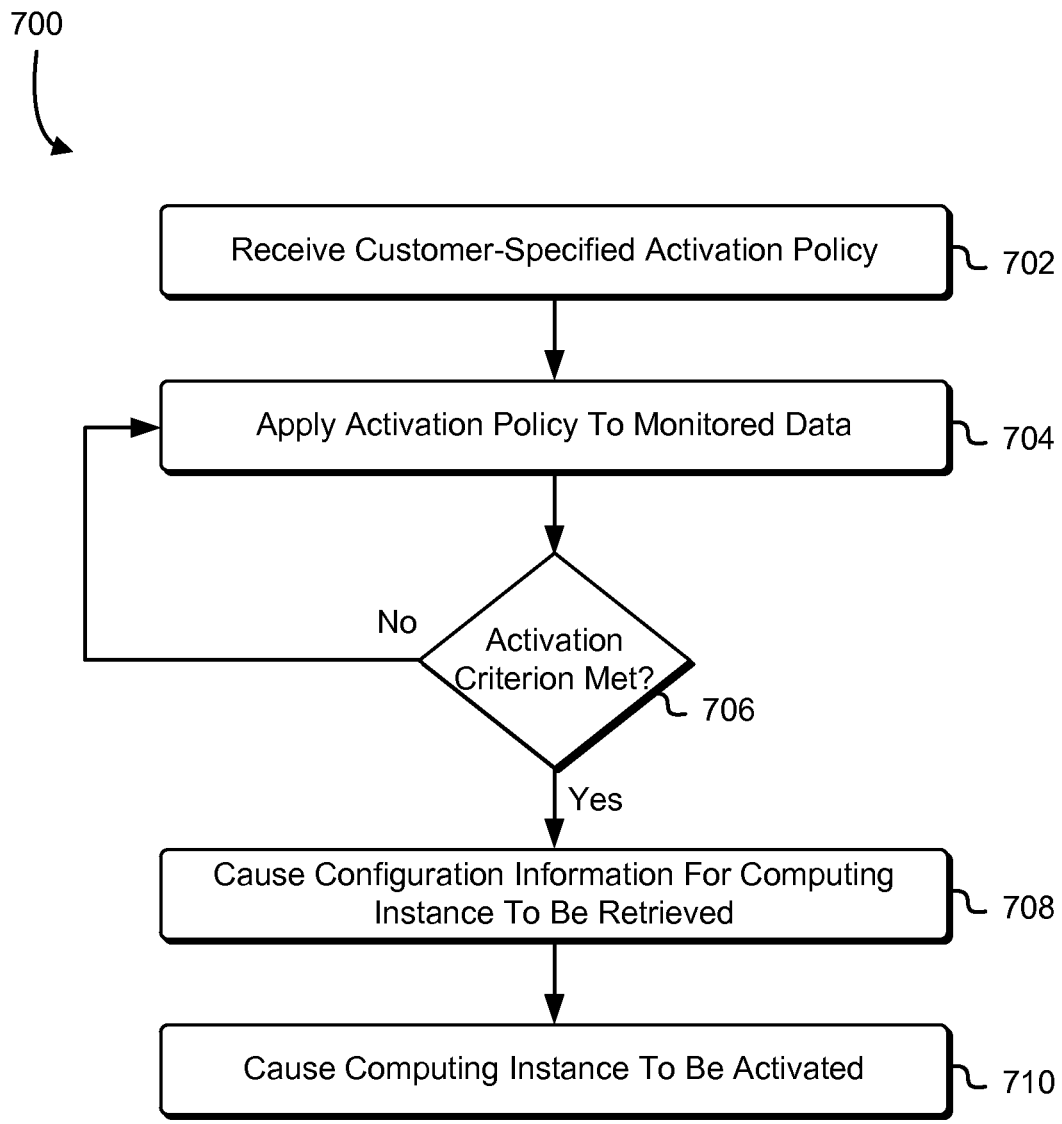
FIG. 7 shows an example of a method for activating a computing instance in accordance with at least one embodiment.

FIG. 7 shows an example of a method for activating a computing instance in accordance with at least one embodiment. In the process 700, a monitoring entity receives 702 a customer-specified activation policy. The activation policy may specify one or more criteria for activating the computing instance as described herein. In addition, the activation policy may also specify one or more criteria for initially launching the computing instance as well as one or more criteria for deactivating the computing instance. The one or more criteria may be based at least in part on I/O volume, an operating schedule, an execution of scheduled tasks or demand for the resources of the computing instance, among others. The customer may specify the activation policy as part of provisioning the computing instance and the policy may be used for launching, deactivating or reactivating the computing instance, whereby the computing resource service provider or an associated entity may be receive the customer policy as an API function call. The activation policy may include a signature (for example, of a network message) that is verifiable by a service provider. The signature may be verifiable due to being generated using a key shared with the service provider or because it was signed with a private key of a public-private key pair.

The customer may provision a computing instance, for example, using a management console, which may include specifying launch configuration for the computing instance, such as computing power for the instance, an operating system for the instance, software configurations and applications, a computing architecture, an instruction set (for example, 32-bit or 64-bit) and storage volumes for the computing instance, among others. The customer may utilize the same activation policy or one or more activation criterion to specify conditions for reactivating more than one computing instance. The monitoring entity applies 704 the activation policy to monitored data and determines 706 whether an activation criterion is met. If it is determined that the activation criterion is not met, the monitoring entities continue to apply 704 the activation policy to monitored data. If, on the other hand, the monitoring entity determines that the activation criterion is met, the monitoring entity causes 708 the configuration information for the computing instance to be retrieved and causes the computing instance to be reactivated based at least in part on the configuration information. In some embodiments, upon deactivation, the memory content associated with the computing instance is stored for use in reactivating the computing instance. The monitoring entity then causes 710 the computing instance to be activated. Activating the computing instance utilizing the configuration information and memory content may ensure the re-launched instance to be in the same state as prior to deactivation and that the instance is capable of performing the desired computing functionality.

In some embodiments, upon deactivation a snapshot of the computing instance may be taken, which may capture the operational state and various configurations of the computing instance. The snapshot may be stored in memory for later use in reconstituting the computing instance upon reactivation. As described herein, the computing instance may be re-launched using the same physical host or a different physical host as used prior to deactivation. Further, the monitoring entity may be capable of predicting that a computing instance is near reactivation based at least in part on, for example, determining that the one or more activation criteria are within a pre-specified of being met or based at least in part on historical data. The one or more activation criteria may also provide indications of whether computing instance is near reactivation. For example, if the one or more activation criteria specify that the instance may only be become active during working hours, resources may not be reserved outside of the working hours. Further, historical data associated with when the activation criteria are met may be used to predict an impending activation or to reserve resources for the instance ahead of activation. For example, if the instance has been historically activated within a margin of a particular time (for example, near the start of a workday), an analysis of the historical data may be performed to reserve resources ahead of the activation. Based on the determination, resources, such as physical hosts and other types of hardware, may be reserved to meet the needs of the computing instance potentially being instantiated. It is noted that in some embodiments, there may be minimum requirements associated with the physical hardware used for resurrecting a computing instance. The resources reserved for instance reactivation may be required to at least meet the minimum requirements.

Figure 8:
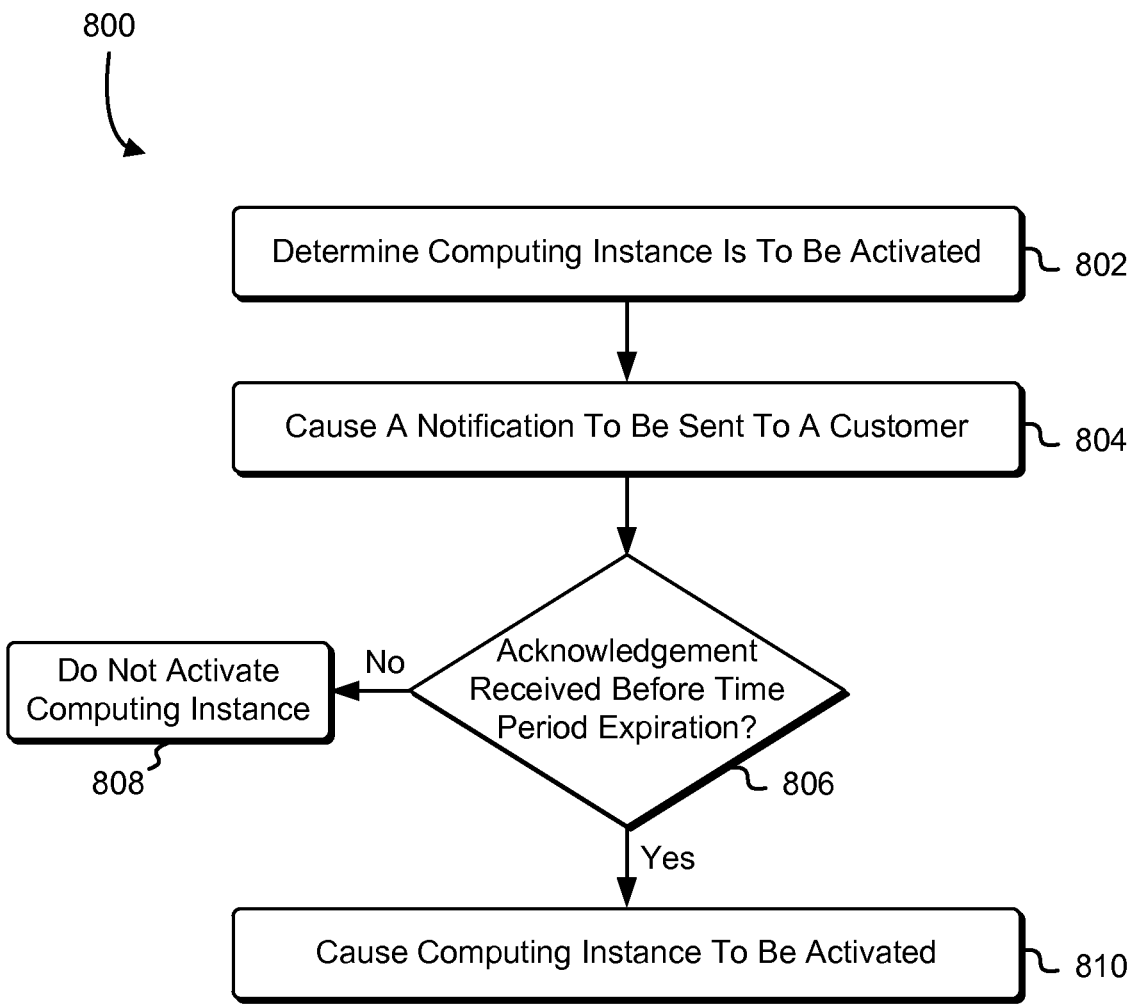
FIG. 8 shows an example of a method for activating a computing instance in accordance with at least one embodiment.

FIG. 8 shows an example of a method for activating a computing instance in accordance with at least one embodiment. In the process 800, a monitoring entity determines 802 that a computing instance is to be activated. The monitoring entity may not be authorized to cause activation of the computing instance, for example, due to the satisfaction of the one or more activation criteria, and may be required to obtain customer authorization prior to activating the computing instance. The monitoring entity causes 804 a notification to be sent to the customer, whereby the notification may request customer authorization of activating the computing instance. The notification service described with reference to numeral 222 in FIG. 2 may be utilized for sending the notification. Further, the notification may be sent as an email to a customer-configured email address or an SMS message to a phone number associated with the customer. The monitoring entity or another entity of the computing resource service provider may start a timer and determine 806 whether an acknowledgement is received before the expiration of the timer. If a negative determination is made, the monitoring entity may not cause 808 the activation of the computing instance. If, however, a positive determination is made, the monitoring entity may cause 810 the computing instance to be activated. It is noted that in alternative embodiments, an indication that the one or more activation criteria are met may be made available to the customer. For example, the indication may be recorded (for example, by logging in the indication) in a database or data store accessible by the customer The one or more activation criteria may specify that customer confirmation is required for the computing instance to be activated. Further, the one or more activation criteria may specify that the customer providing the confirmation be authenticated (for example, using multi-factor authentication). Further, requiring customer confirmation prior to computing instance activation may be used to notify a customer in the event of an intrusion. If the notification is not expected by the customer, receipt of a notification by the customer may alert the customer to the possibility that the customer's computing resource may be infiltrated.

It is noted that the embodiments described herein are advantageous as they may not require a particular reactivation packet, which may have a particular signature or pattern of bits, or an activation command to be used in order to cause the reactivation of a computing resource. Further, it may not be required that a computing resource is listening to a particular packet or in a pseudo-active state in order to receive and process the reactivation packet to cause the computing resource to be reactivated. Instead, a computing instance may be suspended and the underlying computing resources of the computing instance may be repurposed and traffic intended to the computing instance may be monitored and evaluated according to one or more criteria to determine whether the computing instance should be activated for handling the traffic.

In some embodiments, the computing instance may be used to enable a source control repository, such as a Git repository for source code management. The computing instance may be used for sending or checking code in to the source control repository. As described herein, the computing instance may be activated upon receipt of code for the repository and may be deactivated upon the completion of check-in and any other relation operations. A criterion for activation may include receipt of code as a condition for activation and the computing instance may be activated for checking the code in and may be suspended after the code is check in to the source control repository. In some embodiments, an on-demand workflow or pipeline may be constructed, for example, by a customer, for a source control repository. A computing instance that is activated due to a check-in may, upon successfully updating its repository, initiate a wake-up sequence for a second computing instance. The second computing instance may become active and evaluate the latest updates. Further, the second computing instance may perform a build and upon completion may cause itself to become deactivated.

The activation criterion described herein may be utilized for initially launching a computing instance as well as reactivating a deactivated computing instance. In some embodiments, a web address for a web server may be advertised prior to launching a computing instance executing the web server. Instead of launching the computing instance upon advertising the web address, the activation criterion may be utilized to launch the computing instance. For example, the activation criterion may be based at least in part on receiving a connection request to the web server. Accordingly, computing resources for the web server may not idle before requests are made to the web server. The activation criterion may be based on receipt of any type of data by any number and on any port. For example, the activation criterion may specify that the computing resource is to be activated if ten TCP packets are received for a specific port.

In some embodiments, the length of time required for activating a computing instance may be longer than a TCP retry time and some TCP packets may not be processed due to the activation time of the computing instance. For example, if the TCP retry time is 3 seconds for a first packet, 6 seconds for a second packet and 30 seconds for a third packet and the computing instance requires 20 seconds to be launched, then the first and second packets may not be processed. However, the third packet will be received and processed by the active computing instance.

Figure 9:
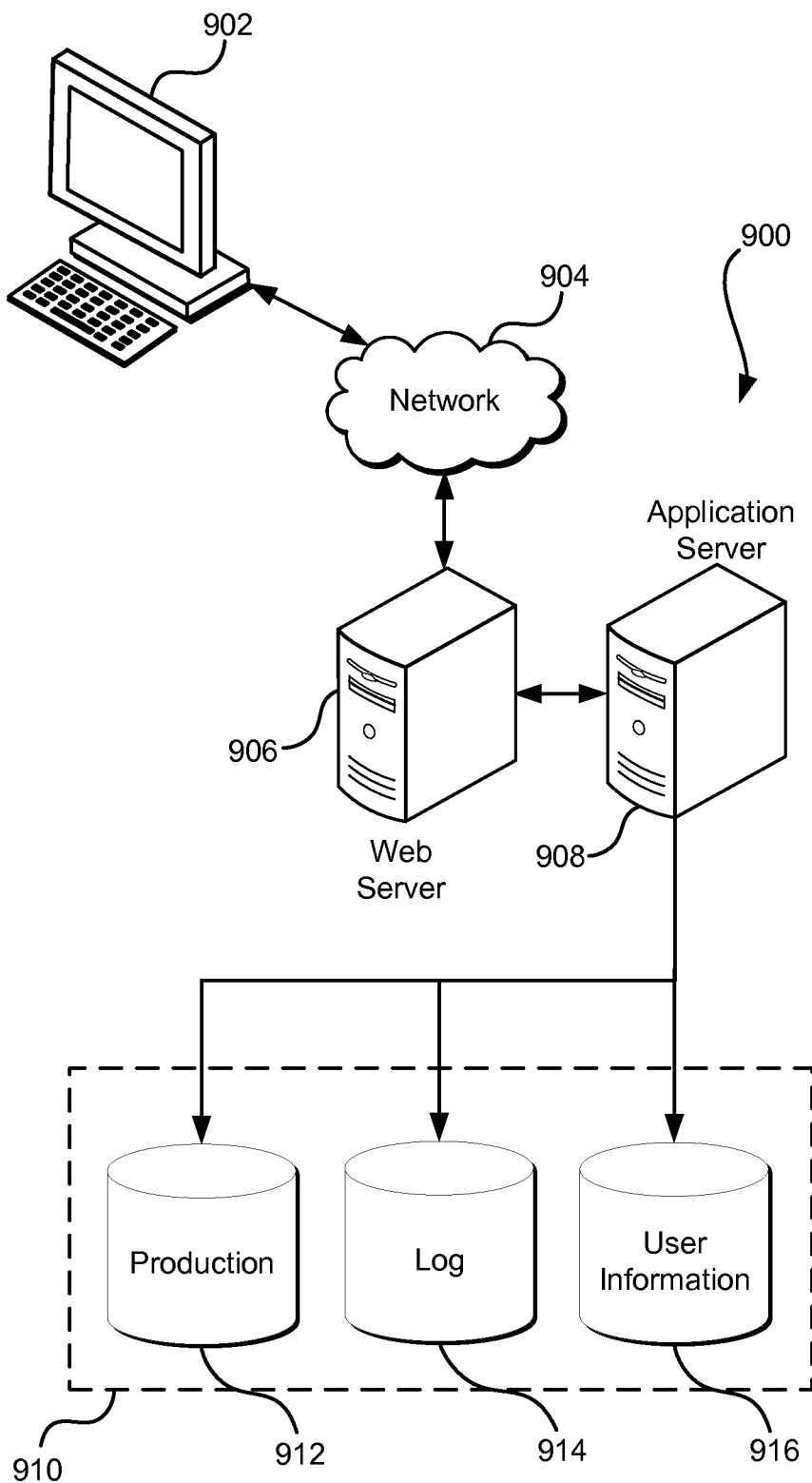
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a customer of a computing resource service provider for which a virtual machine instance is hosted, one or more activation criteria, the one or more activation criteria specifying one or more conditions to activate the virtual machine instance based at least in part on obtained traffic specifying a network address of the virtual machine instance;
   on a condition that the virtual machine instance is not active, associating the network address with a monitoring entity, the monitoring entity managing the network address by at least evaluating the obtained traffic at a network location different from the network location of the virtual machine instance during an interval of time the virtual machine instance was active to determine whether the one or more activation criteria are met;
   propagating updated routing information to at least one routing device of the computing resource service provider to update routing information to reflect that the monitoring entity is managing the network address; and
   on a condition that the one or more activation criteria are met:
      obtaining, for the virtual machine instance, configuration information specifying an operational state of the virtual machine instance, the configuration information generated at a time at which the virtual machine instance was deactivated;
      selecting, based at least in part on the configuration information, a physical host to instantiate the virtual machine instance;
      transmitting, to the physical host, the configuration information to cause the physical host to instantiate the virtual machine instance to cause the virtual machine instance to become active and to have the operational state, whereby as a result of becoming active the virtual machine instance being available to process the obtained traffic; and
      sending the obtained traffic to the virtual machine instance to process the obtained traffic.

2. The computer-implemented method of claim 1, wherein:
   the one or more conditions to activate the virtual machine instance are detected by the monitoring entity and include at least one of a protocol type, a packet count, a packet content, a source port address, a destination port address, a network address, a host address, a time of receipt and a rate of receipt associated with one or more packets of the obtained traffic; and the one or more activation criteria are met if the one or more packets satisfy the one or more conditions to activate the virtual machine instance.

3. The computer-implemented method of claim 1, wherein the configuration information specifies at least one of a computational power, memory size or software configuration associated with the virtual machine instance.

4. The computer-implemented method of claim 1, wherein on a condition that the one or more activation criteria are not met, the method further comprises discarding a portion of the obtained traffic, the discarded portion being excluded from usage in evaluating whether subsequently obtained traffic satisfies an activation condition.

5. The computer-implemented method of claim 1, wherein the method further comprises, on a condition that the one or more activation criteria are met:
  sending an indication to the customer that the one or more activation criteria are met; and
  causing the virtual machine instance to become active on a condition that an acknowledgement is received from the customer.

6. The computer-implemented method of claim 1, wherein transmitting, to the physical host, the configuration information to cause the physical host to instantiate the virtual machine instance further includes launching one or more workflows that specify a set of operations to instantiate the virtual machine instance on the physical host.

7. A system, comprising:
  a compute service implemented by one or more computer systems including processors and memory, wherein the memory includes instructions that upon execution by the processors cause the compute service to at least:
    obtain, through an application programming interface (API) call, one or more criteria to activate a virtual machine instance under control of the compute service and instantiated using individual physical hosts of a plurality of physical hosts;
    as a result of the virtual machine instance being deactivated, assign a network address associated with the virtual machine instance to a computing instance responsible for monitoring the network address while the virtual machine is inactive;
    update routing information so that data directed to the network address is routed to the computing instance;
    obtain the data being addressed to the network address associated with the virtual machine instance;
    evaluate, at the computing instance, the data to determine whether the one or more criteria to activate the virtual machine instance are met; and
    if the one or more criteria are met:
      obtain configuration information of the virtual machine instance;
      select, based at least in part on the configuration information and from the plurality of physical hosts, a physical host to instantiate the virtual machine instance; and
      provide, to the physical host, the configuration information to cause the physical host to instantiate the virtual machine instance, to cause the virtual machine instance to become active.

8. The system of claim 7, wherein the one or more criteria to activate the virtual machine instance specify one or more of a protocol type of a data packet, a number of data packets, a packet content, a source port associated with the data packet, a destination port associated with the data packet, a network address, a host address, a time of receipt of the packet and a rate of receipt of the packet.

9. The system of claim 7, wherein the compute service further:
  excludes data associated with at least one of port scanning, probing, or networking mapping from evaluation in determining whether the one or more criteria to activate the virtual machine instance are met; and
  deletes at least a portion of the obtained data if the one or more criteria are not met.

10. The system of claim 7, wherein the compute service further:
  tracks one or more activation times associated with the virtual machine instance, the one or more activation times representing historical activation times of the virtual machine instance; and
  reserves computing resources for the virtual machine instance based at least in part on an analysis of the one or more activation times.

11. The system of claim 7, wherein:
  the one or more criteria to activate the virtual machine instance are received from a customer; and
  the compute service further, if the one or more criteria are met, generates an indication that the one or more activation criteria are available to the customer.

12. The system of claim 11, wherein the compute service further causes the virtual machine instance to become active and transmits the data to the virtual machine instance, to process the data, on a condition that an acknowledgement is received from the customer.

13. The system of claim 7, further comprising a usage tracking service that:
  as a result of the virtual machine instance becoming active, monitors utilization metrics of the virtual machine instance; and
  causes the virtual machine instance to be deactivated based at least in part on the utilization metrics.

14. A non-transitory computer-readable storage medium storing thereon executable instructions that, as a result of being executed by one or more processors of a computer system, cause the computer system to at least:
  obtain one or more data packets specifying a network address assigned to a virtual machine instance;
  associate the network address with a computing instance based at least in part on the virtual machine instance being in a hibernated state;
  generate an update to a routing table as a result of associating the network address with the computing instance, the update when applied by one or more routing devices to the routing table causing the one or more data packets to be routed to the computing instance;
  generate a determination to activate the virtual machine instance based at least in part on the one or more data packets satisfying one or more conditions to activate the virtual machine instance, the one or more conditions specifying at least one of a packet count, a packet type, or a port number associated with the one or more data packets;
  obtain, based at least in part on the determination, configuration information corresponding to the virtual machine instance;
  select, based at least in part on the configuration information, a host to activate the virtual machine instance; and
  cause a request to activate the virtual machine instance to be sent to the physical host, the request including the configuration information.

15. The non-transitory computer-readable storage medium of claim 14, wherein the instructions further cause the computer system to track one or more activation times associated with the virtual machine instance, the one or more activation times representing historical activation times of the virtual machine instance.

16. The non-transitory computer-readable storage medium of claim 15, wherein the instructions further cause the computer system to reserve computing resources for the virtual machine instance based at least in part on an analysis of the one or more activation times.

17. The non-transitory computer-readable storage medium of claim 14, wherein the one or more conditions further specify at least one of a network address, a host address, a time of receipt, or a rate of receipt of the one or more data packets.

18. The non-transitory computer-readable storage medium of claim 14, wherein:
    a data packet of the one or more data packets is associated with a lifespan timer; and
    the instructions that cause the computer system to generate the determination to activate the virtual machine instance further cause the computer system to exclude the data packet from the determination on a condition that the lifespan timer is expired.

19. The non-transitory computer-readable storage medium of claim 14, wherein the instructions further cause the computer system to receive the one or more conditions to activate the virtual machine instance from a customer.

20. The non-transitory computer-readable storage medium of claim 19, wherein the instructions further cause the computer system to:
    send an indication to the customer that the one or more data packets satisfy the one or more conditions to activate the virtual machine instance; and
    activate the virtual machine instance on a condition that an acknowledgement is received from the customer.

21. The non-transitory computer-readable storage medium of claim 14, wherein the instructions further cause the computer system to activate the virtual machine instance based at least in part on the configuration information.

* * * * *